Patented Oct. 22, 1946

2,409,614

UNITED STATES PATENT OFFICE 2,409,614

REFINING SULFATE TURPENTINE

Robert Albert Collins, Brunswick, Ga., assignor to Hercules Powder Company, Wilmington, Del., a corporation of Delaware No Drawing. Application January 15, 1942, Serial No. 426,883

8 Claims. (Cl. 260—675.5)

This invention relates to a method of refining turpentine and, more particularly, relates to the induced oxidation of crude sulfate turpentine by means of oxidizing agents at elevated temperatures as a means of improving the odor thereof.

Sulfate turpentine is principally obtained as a by-product in the manufacturing of wood pulp cellulose by the sulfate process. The sulfate turpentine is characterized by a vile, sickening odor, which odor is due to the formation of various mercaptans during the delignification of wood. It is well known that this sulfate turpentine is an excellent source of terpenes, especially pinene, but because of the extremely pronounced and offensive mercaptan odor has little commercial value. Herebefore, various methods, especially oxidation methods, have been suggested for the refining of compositions containing odor producing compounds, especially mercaptans, but none have been found commercially successful when applied to sulfate turpentine compositions. The use of cadmium sulfide as a catalyst at elevated temperatures and pressures is not satisfactory because the high temperatures cause serious breakdown of the terpenes. Oxidation by means of carefully controlled concentrations of sodium hydroxide is not practical because different mercaptans require different concentration of sodium hydroxide and sulfate turpentine contains several different mercaptans. Oxidation by means of mercuric oxide is not practical because of the scarcity and cost of the reagent. The use of sodium plumbite (doctor solution), long used in the petroleum industry, temporarily removes the obnoxious odors but upon distillation the turpentine reverts to its malodorous state. Other oxidation methods successful in treating other compositions have failed to produce the desired results on sulfate turpentine compositions. The removal of mercaptan compounds must be substantially complete since even the smallest trace of these compounds produces a vile and sickening odor.

Now, in accordance with this invention, the method of removal of obnoxious odor producing compounds from sulfate turpentine compositions comprises generally the step of peroxide enriching the composition as by an air-blowing operation of the composition per se or by the addition of a peroxide as, for example, a terpene peroxide and subjecting the peroxide enriched composition to a heating operation, which operation produces a composition substantially free of obnoxious odor producing compounds, and which odor free composition will not revert to its previous malodorous state regardless of subsequent treatments to which the composition may be subjected.

More particularly, the air-blowing operation is carried out on sulfate turpentine which has been fractionated in any suitable fractionating column to cause the removal of the first 1 to 5 per cent of light end material which comprises the most strongly odorous portion. The air-blowing operation is carried out in suitable equipment for allowing efficient contact of the oxidizing agent containing gaseous medium as, for example, air or air enriched with an oxidizing agent with the sulfate turpentine being treated. The suitable equipment may consist of an externally heated reaction vessel upon which is superimposed a tower packed with small glass cylinders, or other suitable means for providing a large contact surface and provided with heating and cooling means adapted to maintain a tower temperature between about 60° C. and about 156° C. and preferably about 100° C. The top of the tower may be provided with an expansion chamber vented to the atmosphere and which expansion chamber may be connected by suitable return means to the reaction vessel. In carrying out the refining operation, air is bubbled or blown into the reaction vessel in predetermined amounts forcing and carrying the sulfate turpentine composition up the packed tower and into the expansion chamber where the air and turpentine composition are separated. All or part of the treated turpentine composition may be returned to the reaction vessel for further treatment. The air is exhausted to the atmosphere from the expansion chamber.

The refining operation in accordance with this invention is illustrated by the following examples, all parts and percentages being by weight unless otherwise specified.

EXAMPLE 1

OXIDATION OF "TOPPED" CRUDE SULFATE TURPENTINE

The crude sulfate turpentine used in this example was analyzed according to standard A. S. T. M. distillation methods and the following physical properties and composition noted:

*Physical properties*

| | |
|---|---|
| 5% | ° C__ 154 |
| 10% | ° C__ 159.0 |
| 20% | ° C__ 161.0 |
| 30% | ° C__ 161.6 |

| | | |
|---|---|---|
| 40% | °C | 162.4 |
| 50% | °C | 163.0 |
| 60% | °C | 164.0 |
| 70% | °C | 164.8 |
| 80% | °C | 166.8 |
| 90% | °C | 172.0 |
| 95% | °C | 181.0 |
| Specific gravity 15.6° C./15.6° C | | .8654 |
| Unpolymerized residue from 38 N. sulfuric acid | | Nil |
| Refractive index | | 1.4709 |
| Specific rotation | degrees | +2.71 |

*Composition*

(1) 1.5% boiling at 35°–40° C.
(2) 82.0% pinene fraction (about 90% alpha and 10% beta pinene.
(3) 11.5% monocyclic hydrocarbons.
(4) 1.5% pine oil.
(5) .2% estragole.
(6) 1.3% other distillable high boiling oils 180–212° C.
(7) 2.0% non-distillable constituents.

In this example, a quantity of this crude sulfate turpentine was treated in the following manner:

*Step 1, "topping" of crude composition.*—A quantity of the above whole crude sulfate turpentine was fractionated and 5.5% light end was removed.

*Step 2, air oxidation.*—40 parts of this fractionated or "topped" sulfate turpentine having a specific gravity of .8662° at 15.6° C./15.6° C. was then air blown in a suitable tower for 4 hours and 20 minutes at 100° C. The air rate was maintained at about 1.7 cubic feet per minute under a pressure of 1.0 lb. per square inch, a rate calculated to maintain the volatilization and carry over losses at a minimum. By this oxidation operation, specific gravity of the fractionated sulfate turpentine increased to .8739° at 15.6° C./15.6° C. About 4% of the composition volatilized into the air. After this step, the odor of the composition was considered satisfactory.

*Step 3, steam distillation of oxidized composition.*—The oxidized sulfate turpentine was then steam distilled at 96° C. to free it from the heavy end material. The high boiling "heel" amounted to about 3% of the charge.

EXAMPLE 2

OXIDATION OF FRACTIONATED CRUDE PLUS OXYGEN CARRIER

In this example, a quantity of crude sulfate turpentine having the physical properties and composition noted in Example 1 was treated in the following manner:

*Step 1, fractionation of crude composition.*—A quantity of the crude sulfate turpentine was fractionated to remove both the light and heavy ends. About 7% of the charge was removed by this fractionating operation.

*Step 2, addition of oxygen carrier.*—To the fractionated turpentine was added 2 parts of the oxygen carrier, terpinolene.

*Step 3, air oxidation.*—The oxygen carrier enriched sulfate turpentine mixture having a specific gravity of .8641° at 15.6° C./15.6° C. was then subjected to an air-blowing oxidation operation in a suitable tower for 5 hours and 15 minutes at a temperature of between 100° to 102° C. An air rate was maintained at about 1.7 cubic feet per minute at a pressure of 1.0 lb. per square inch, a rate calculated to maintain the volatilization and carry over losses at a minimum. At the end of this operation, the mixture was free of the malodorous producing compounds. By this oxidation operation, the specific gravity of the oxidized mixture increased to .8733°. About 6% of the turpentine mixture volatilized into air.

*Step 4, steam distillation of oxidized mixture.*—The oxidized sulfate turpentine mixture was then steam distilled to separate the pure unoxidized turpentine from the small oxidized constituents formed during the oxidation process.

EXAMPLE 3

OXIDATION OF FRACTIONATED CRUDE SULFATE TURPENTINE PLUS CAUSTIC WASHING

In this example, a quantity of crude sulfate turpentine having the physical properties and composition noted in Example 1 was treated in the following manner:

*Step 1, fractionation of crude composition.*—A quantity of the above "crude sulfate turpentine" was fractionated and 5.5% light ends and 8% "heel" was removed.

*Step 2, air oxidation.*—42 parts of this fractionated sulfate turpentine having a specific gravity of .8630° at 15.6° C./15.6° C. and having a refractive index at 20° C. of 1.4696 was then air blown in a suitable tower for 4 hours between 96° C. to 102° C. An air rate was maintained at about 1.7 cubic feet per minute at a pressure of 1.0 lb. per square inch, a rate calculated to maintain the volatilization and carry over losses at a minimum. By this oxidation treatment, the specific gravity of the sulfate turpentine increased to 0.8702° at 15.6° C./15.6° C. and the refractive index increased to 1.4711 at 20° C. 4 parts of this charge was lost by volatilization to the atmosphere. After this step of the operation, the odor of the composition was considered satisfactory.

*Step 3, steam distillation of oxidized mixture.*—The oxidized mixture was then steam distilled in the presence of water to free it from the heavy end materials. The steam distilled oils had a specific gravity at 15.6° C./15.6° C. of 0.8646 and a refractive index at 20° C. of 1.4701.

*Step 4, caustic washing of steam distilled mixture.*—The steam distilled mixture was washed 3 times with a 10% caustic solution and the resulting product had a specific gravity at 15.6° C./15.6° C. of 0.8644 and a refractive index at 20° C. of 1.4700.

*Step 5, fractionation of caustic washing mixture.*—The caustic washing mixture was fractionated to remove heavy end products. A major portion of the charge came over at a distillation temperature of about 155.5° C.

EXAMPLE 4

OXIDATION OF PURIFIED COMMERCIAL SULFATE TURPENTINE

In this example, a quantity of purified commercial sulfate turpentine having an offensive odor was treated in the following manner:

*Step 1, air oxidation.*—40 parts of this mixture having a specific gravity of .8645° at 15.6° C./15.6° C. was air blown in a suitable tower for 2 hours at a temperature between 101° C. to 103.4° C. An air rate was maintained at about 1.7 cubic feet per minute at a pressure of 1.0 lb. per square inch, a rate calculated to maintain the volatilization and carry over losses at a minimum. By this oxidation treatment, the specific gravity of the mixture was increased to .8694° at 15.6° C./15.6° C. About 2.1% of the charge was lost by volatilization into the air. At the end of the 2-hour oxidation period, the turpentine mixture was free of any sulfur odor.

*Step 2, steam distillation of oxidized composition.*—The oxidized mixture was then steam distilled at a temperature of between 96° C. to 98° C. to separate the pure unoxidized turpentine from the oxidized constituents.

EXAMPLE 5

PEROXIDE ENRICHING OPERATION OF SULFATE TURPENTINE COMPOSITION AND SUBSEQUENT DEODORIZATION BY HEAT

*Step 1, peroxide formation operation.*—In this example a quantity of a terpene hydrocarbon rich in terpinolene was air oxidized in the cold (28–44° C.) to yield a product containing 13.3% terpinyl peroxides determined by means of the iodine liberation value.

*Step 2, topping operation of crude sulfate turpentine.*—A quantity of crude sulfate turpentine having the physical properties and composition noted in Example 1 was topped to remove 5½% light ends.

*Step 3, deodorization operation by heat.*—A 50–50 mixture of the resulting compositions produced in Steps 1 and 2 was made having a specific gravity of 0.9144 at 15.6/15.6° C. The mixture was subjected to a heating operation for 7¾ hours at a temperature of 100° C. to 103.5° C. The specific gravity of the mixture increased during the heating operation from 0.9144 to 0.9245 at 15.6/15.6° C. The refractive index increased from 1.4837, the refractive index of the mixture before heating, to 1.4858 at 20° C. The odor of the composition after the heating operation possessed substantially no "sulfur" odor.

EXAMPLE 6

PINENE ENRICHED SULFATE TURPENTINE AND SUBSEQUENT DEODORIZATION BY HEAT

*Step 1, oxidation of pinene.*—50 cc. of pinene was air oxidized in a suitable apparatus for a period of 52.5 hours at a temperature ranging from 20° C. to 51° C. The oxidized pinene contained 9.0% peroxides after the oxidation operation.

*Step 2, deodorization operation by heat.*—50 cc. of crude sulfate turpentine having the physical properties and composition noted in Example 1 was topped to remove a portion of the light end and "heel." To this treated crude sulfate turpentine was added the pinene from Step 1 and the mixture heated for six hours at a temperature noxious odor was removed. The specific gravity of the mixture was increased from 0.8776 to 0.8803 at 15.6/15.6° C. The final mixture contained 1.8% peroxides. Separation of the odor refined turpentine from the oxidized constituents formed as a result of the heating operation was made in accordance with the method described with reference to the foregoing examples.

EXAMPLE 7

OXIDIZATION OF CRUDE SULFATE TURPENTINE AT REDUCED TEMPERATURE

In this example, 4000 cc. of crude sulfate turpentine having the physical properties and composition noted in Example 1 was topped to remove the light end and "heel" and then air oxidized for 20 hours at a temperature of from 58 to 64° C. The specific gravity at 15.6/15.6° C. increased from 0.8672 to 0.8828. An 86% yield of odorless product was obtained having a 4% peroxide content. Separation of the odor refined turpentine from the high boilers or oxidized constituents formed as a result of the oxidation operation, was made by means of a distillation operation in the manner described with reference to the foregoing examples.

In more detailed consideration of the method of refining crude sulfate turpentine in accordance with this invention, it was found that better results are obtained in a more economical manner when between about 1% to about 10% and preferably about 5.5% of the light end of the turpentine was "topped" off as by fractionation. The first 27.2% of this 5.5% light end was found to contain about 7.5% sulfur; the remaining 72.8% of the 5.5% light end was found to contain about 1.4% sulfur. The charge resulting after the "topping" operation was analyzed for sulfur content and only traces of sulfur could be detected. It is well-known, however, that very minute traces of mercaptans in a composition as, for example, sulfate turpentine produces a vile and sickening odor thereby limiting its commercial uses.

An alternative method of removing a major portion of the sulfur content of the crude sulfate turpentine comprises washing a quantity of crude sulfate turpentine as, for example, 500 cc. with about twelve 50 cc. portions of approximately 4% sodium hydroxide in 100% of methyl alcohol. A final wash with 500 cc. of water was used to remove any dissolved alcohol, and the product was dried. Different strengths of the caustic and methanol used in the washing process may be used as, for example, 1000 cc. of crude sulfate turpentine was washed several times with 100 cc. portions of approximately 10% sodium hydroxide and 90% methyl alcohol. A final wash with 500 cc. of water was used to remove dissolved alcohol. The product was then dried in any suitable manner. A 250 cc. sample of the dried product from each of the above washes was distilled through a vacuum jacket column and the fraction 30–80% was collected which boiled at 156.7° C. While this treatment greatly improved the odor of the sulfate turpentine, complete removal of the odor was not accomplished. Complete removal of odor from the caustic methanol washed sulfate turpentine was made after treatment with air at an elevated temperature.

According to the method of this invention, the "whole" sulfate turpentine may be refined according to the novel air oxidation "without topping," which "topping" removed a major portion of the sulfur bearing compounds, but a more economical method was provided when the turpentine was "topped." To refine the crude sulfate turpentine containing this light end would require excessive oxidation which would result in the formation of a certain amount of heavy end non-distillable polymerized pinenes, (alpha and beta pinene comprises a major component of the turpentine) at the expense of the turpentine and thus be uneconomical. Thus, it may be seen that it is important to control the amount of oxidation to which the sulfate turpentine is subjected and that this may be done by a "topping" operation. The amount of oxidation may be further controlled by removing the "heel" of the turpentine mixture which may amount to between about 4% and about 12% and generally about 8% of the charge. However, when the "heel" was removed as by fractionation, the yield of turpentine was reduced after the air oxidation operation.

After the fractionation operation to remove the light end or "heel" or both the remainder of the original sulfate turpentine charge was cooled to approximately 100° C., at which temperature it was air blown or air oxidized in suitable equipment for allowing complete contact of the air or other suitable oxidizing agent with the sulfate turpentine being treated. The temperatures between about 60° C. and about 156° C. are operable but it is preferred to carry out the oxidation process at about 100° C. for most economical results.

Where low temperature oxidation is used, that is temperatures below those used in Example 7, there is an accumulation of peroxides which is a potential hazard in large scale operation, because of the gas evolving, self-propagating, exothermic decomposition reaction of the peroxides when heated.

When the oxidation is carried out under temperatures described in Example 7, a greater percentage of undesirable oxidation occurs than when the oxidation is carried out at relatively higher temperatures. The addition of about 0.2 gram of vanadic acid ($V_2O_5$) per 1000 cc. of topped crude sulfate turpentine effectively reduced the amount of undesirable oxidation. Oxidation of a quantity of crude sulfate turpentine was repeated under the conditions of Example 7 but with the addition of proper amount of vanadic acid. Analysis of the resulting product showed a peroxide content of 0.35%. It appears that the vanadic acid catalyzes the decomposition of the peroxides. Other suitable catalysts may be used to effect the same result.

Typical equipment used to carry out the air oxidation operation of this invention consisted of an externally heated reaction vessel, upon which was superimposed a contact tower packed with small glass cylinders adapted to permit complete contact of the oxidizing medium with the liquid to be treated. The vessel may be internally heated or otherwise heated in any convenient manner so that the reaction may be carried out at the preferable temperature. In addition to using small glass cylinders as a means of exposing a maximum surface of the liquid to the oxidizing agent, pebbles, Berl saddles or Raschig rings may also be used to accomplish this result. A bubble-cap plate tower may also be used.

The reaction vessel was provided with a feed entrance for the admission of the liquid sulfate turpentine and air tuyères properly spaced to permit the entrance of the oxidizing medium into the reaction vessel, whereby the gaseous medium was forced under a pressure of about 1.0 lb. per square inch through the mixture of turpentine up the packed tower carrying the turpentine mixture with it. As the mixture passed up through the tower, the small glass cylinders caused a large surface exposure of the liquid to the oxidizing action of the air. As the oxidized mixture reached the upper end of the tower, it entered an expansion chamber or an area of reduced pressure relative to the back pressure in the tower where the gaseous medium separated from the oxidized turpentine mixture. The gaseous medium was exhausted to the atmosphere through a suitable relief valve and about 90% of the oxidized turpentine was returned to the reaction vessel by a suitable return means for further treatment by fresh oxidizing medium.

Suitable temperature controlling means were employed to maintain the temperature of the oxidizing tower at substantially 100° C., the most operable and economical temperature conditions for the purposes of this invention. Means was also employed, whereby the odor of the oxidized material could be observed, and therefore a more efficient operation of the oxidization process was carried out. Means was also provided for determining at predetermined intervals the rise of the specific gravity of the mixture as it was being progressively oxidized.

It was found that the oxidized product at this stage of the refining operation was substantially free of the sulfur (mercaptan) odor and was considered commercially usable turpentine. However, further improvement of the refined turpentine may be made by a fractional distillation to separate the unoxidized turpentine from the oxidized constituents which has no odor. These oxidized constituents comprise between about 5% and about 10% of the treated turpentine mixture. The treated turpentine may be steam distilled at about 100° C. to separate the desirable refined unoxidized turpentine from the high boiling and substantially non-distillable oxidized and polymerized constituents.

A quantity of oxidizing agent is passed through the turpentine composition in an amount sufficient to eliminate the malodorous producing compounds. This amount is determined by the amount of malodorous producing compounds present. The oxidizing agent may be passed through the composition at a rate calculated to keep the carry-over loss of turpentine at a minimum and at a pressure sufficient to pass through the composition at the minimum carry-over loss rate.

The oxidation operation may be carried out under a pressure sufficient to prevent loss of turpentine through volatilization. The temperature of the system will be sufficient to permit stabilization of the system during the air oxidation operation. This stabilization temperature is found to promote the auto oxidation operation which is inherent in this oxidation operation. The oxidation operation may be carried out under vacuo, maintaining the temperature sufficient to permit stabilization of the system or promote auto oxidation in the manner described with reference to pressure oxidation operation. Vacuo oxidation operation is not preferred since there is a tendency to increase the loss of turpentine composition through volatilization.

It was found that oxygen supplied by any suitable air source worked effectively in the oxidation operation. However, any other gaseous inert oxygen agent carrier may be used as, for example, nitrogen, helium, argon, etc., which inert carrier contains an oxidizing agent in quantities most economical for oxidation of the sulfate turpentine mixture. It was also found that the oxidizing medium of air may be enriched with additional oxygen or other suitable oxidizing agent.

The amount of oxidizing agent needed to treat the sulfate turpentine composition is dependent upon the oxidation temperature used, the rate of admission of the oxidizing agent to the composition, the type of reaction vessel being used, and the condition of the sulfate turpentine at the start of the oxidation operation. A change in any of these variables will effect the amount of oxidizing agent needed to properly treat the composition.

The crude sulfate turpentine composition may be treated by the addition of terpinyl peroxides, as, for example, terpene peroxide and then the peroxide enriched mixture maintained at an elevated temperature between about 60° C. and about 156° C. and preferably about 100° C. By treating the sulfate turpentine in this manner, it is not necessary to subject the crude sulfate turpentine composition to an air blowing operation which otherwise has a tendency to form oxidized constituents or other heavy end material unless controlled as hereinbefore described.

The terpinyl peroxide may be conveniently formed by air oxidizing in the cold a terpene hydrocarbon rich or enriched with an oxygen carrier as, for example, terpinolene in any suitable apparatus as, for example, the oxidation tower hereinbefore described.

A modification of the above noted reaction vessel with a superimposed packed tower may comprise a reaction tower of substantial length and of a relatively small diameter in which the sulfate turpentine may be maintained at a temperature of about 100° C., while a properly distributed oxidizing medium as, for example, air is bubbled through the turpentine mixture. Further improvement of the oxidized turpentine mixture may be made according to the methods outlined above.

The process of oxidation in accordance with the present invention may be assisted or substantially increased by means of the addition of about 5% of a suitable oxygen carrier as, for example, pinene and terpinolene, or any compound which may be made to liberate oxygen may be made operable. Such compounds may be aliphatic peroxides, as, for example, dimethyl peroxide, diethyl peroxide, etc., and aromatic peroxides as, for example, benzoyl peroxide, etc. Other compounds that may be used are hydrogen peroxide, metallic peroxides as, for example, sodium, potassium, barium, etc.

The addition of about 5% of a terpene oxygen carrier to the crude sulfate turpentine assisted in the oxidation and purification of the sulfate turpentine by reducing the amount of oxidation necessary to produce the desired results and thereby reduced the amount of polymerization and oxidation of the essential terpenes present in the mixture and increased the yield of desirable products. It may be noted that the addition of terpinolene is not essential to the successful oxidation operation because the turpentine constituents of the sulfate turpentine mixture acts as oxygen carriers and form terpene peroxides in amounts ample for the purification of the sulfate turpentine.

Although the process of refining turpentine in accordance with this invention is adapted especially to refining crude sulfate turpentine as, for example, the turpentine resulting as a by-product from the manufacture of wood pulp cellulose sulfate process, the process may also be used to complete the purification of so-called refined sulfate turpentine which still contains traces of the very noticeable and undesirable sulfur odor.

The chemical mechanism of the oxidation operation in accordance with this invention may be considered and it is believed to be an auto oxidation, or an induced or coupled oxidation operation. This auto oxidation is believed to take place by the formation of peroxides which are considered to be in a nascent condition at elevated temperature as, for example, 100° C. and in this nascent condition act to oxidize the sulfur compounds or SH groups to a sulfuric acid derivative of the sulfur compound, thereby changing their composition in such a way that the treated sulfate turpentine is free of the sulfur odor. It is known that various terpenes oxidize readily at standard pressures and temperatures and in so oxidizing form a certain quantity of terpene peroxides. These terpene peroxides, which are unstable and break down upon heating, are the refining agents used in accordance with the process of this invention. When the oxidation of sulfate turpentine containing terpenes is carried out at elevated temperatures, for example, at a temperature of about 100° C., and normal pressures, the terpene peroxides which are formed are immediately reduced by the other terpenes present, which are of themselves in turn oxidized and the whole oxidized product is said to be stabilized. The peroxides at about 100° C. might be referred to as being in the nascent condition and in this nascent condition readily act to oxidize sulfur compounds or SH groups to oxygen containing sulfur compounds in which the oxygen is linked to a sulfur or carbon atom and thereby destroy the odor producing compounds originally present in the unrefined sulfate turpentine. Oxidation of the odor producing compounds takes place at temperatures between about 60° C. and about 156° C. and most complete and economical oxidation takes place at about 100° C. and substantially normal pressure.

In accordance with this invention, a novel oxidation process has been provided which will give a maximum yield of commercially usable turpentine from heretofore commercially unusable sulfate turpentine mixtures.

What I claim and desire to protect by Letters Patent is:

1. A process which comprises heating a topped sulfate turpentine composition consisting of a liquid phase consisting of terpene components and contaminated with odor-imparting impurities at a temperature between about 60° C. and about 156° C. for about two to about twenty hours while simultaneously passing air through said composition, until the odor of said composition has been improved.

2. A process which comprises heating a composition consisting of topped sulfate turpentine in liquid phase and contaminated with odor-imparting impurities at a temperature between about 60° C. and about 156° C. for about two to about twenty hours while simultaneously passing air through said composition, until the odor of said composition has been improved.

3. A process which comprises heating a composition consisting of topped sulfate turpentine in liquid phase and contaminated with odor-imparting impurities at a temperature between about 100° C. and about 156° C. for about two to about twenty hours while simultaneously passing air through said composition, until the odor of said composition has been improved.

4. A process which comprises heating a composition consisting of topped sulfate turpentine in liquid phase and contaminated with odor-imparting impurities at a temperature of about 100° C. for about two to about twenty hours while simultaneously passing air through said composition, until the odor of said composition has been improved.

5. A process which comprises heating a composition consisting of topped sulfate turpentine in liquid phase and contaminated with odor-imparting impurities at a temperature between about 60° C. and about 156° C. for about four to about eight hours while simultaneously passing air through said composition, until the odor of said composition has been improved.

6. A process which comprises heating a composition consisting of topped sulfate turpentine in liquid phase and contaminated with odor-imparting impurities at a temperature between about 100° C. and about 156° C. for about four to about eight hours while simultaneously passing air through said composition, until the odor of said composition has been improved.

7. A process which comprises heating a composition consisting of topped sulfate turpentine in liquid phase and contaminated with odor-imparting impurities at a temperature of about 100° C. for about four to about eight hours while simultaneously passing air through said composition, until the odor of said composition has been improved.

8. A process which comprises heating a composition consisting of topped sulfate turpentine in liquid phase and contaminated with odor-imparting impurities at a temperature between about 60° C. and about 156° C. for about two to about twenty hours while simultaneously passing air through said composition, until the odor of said composition has been improved, then distilling said composition to recover a fraction of sulfate turpentine substantially free of malodorous components.

ROBERT ALBERT COLLINS.